United States Patent
Nakashima et al.

(10) Patent No.: US 8,110,302 B2
(45) Date of Patent: Feb. 7, 2012

(54) BATTERY PACK

(75) Inventors: Takuya Nakashima, Osaka (JP); Shunsuke Yasui, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/132,761

(22) PCT Filed: Sep. 29, 2010

(86) PCT No.: PCT/JP2010/005847
§ 371 (c)(1),
(2), (4) Date: Jun. 3, 2011

(87) PCT Pub. No.: WO2011/052134
PCT Pub. Date: May 5, 2011

(65) Prior Publication Data
US 2011/0250487 A1    Oct. 13, 2011

(30) Foreign Application Priority Data
Oct. 26, 2009  (JP) ................................. 2009-245623

(51) Int. Cl.
*H01M 2/22* (2006.01)
*H01M 2/20* (2006.01)
(52) U.S. Cl. ......... 429/158; 429/159; 429/211; 429/241
(58) Field of Classification Search .......... None
See application file for complete search history.

(56) References Cited

U.S. PATENT DOCUMENTS 6,245,462 B1 * 6/2001 Kao et al. ....................... 429/241
6,399,253 B1 * 6/2002 Chang et al. .................. 429/233

FOREIGN PATENT DOCUMENTS

| JP | SHO 49-080313 | 10/1947 |
| JP | SHO 60-060868 | 4/1985 |
| JP | 08-010056 | 1/1996 |
| JP | 09-199177 | 7/1997 |
| JP | 2005-285652 | 10/2005 |
| JP | 2007-280679 | 10/2007 |

* cited by examiner

*Primary Examiner* — John S Maples
(74) *Attorney, Agent, or Firm* — McDermott Will & Emery LLP

(57) ABSTRACT

Provided is a battery pack in which the production of heat due to passage of current in a connector for connecting secondary batteries in parallel is made uniform to increase service life and reduce maintenance costs. A positive terminal connector 14 comprises a connector 14 with through-holes 18. The connector 14 is divided into two regions: a distant region which is distant from the portion connected to an external terminal; and a close region which is close to the connection portion and has the same area as the distant region. The connector 14 is formed so that the open area ratio of the distant region is greater than that of the close region. Thus, the electrical resistance of the close region can be made smaller than that of the distant region. Therefore, the production of heat due to passage of current in the close region can be suppressed.

11 Claims, 3 Drawing Sheets

BATTERY PACK

RELATED APPLICATIONS

This application is the U.S. National Phase under 35 U.S.C. §371 of International Application No. PCT/JP2010/005847, filed on Sep. 29, 2010, which in turn claims the benefit of Japanese Application No. 2009-245623, filed on Oct. 26, 2009, the disclosures of which Applications are incorporated by reference herein.

TECHNICAL FIELD

This invention relates to a battery pack including a unit comprising a plurality of batteries connected in parallel.

BACKGROUND ART

Battery packs, each comprising a plurality of connected secondary batteries, have been widely used as the power source for mobile devices such as portable electronic appliances and electric vehicles. PTL 1 shows an example of a battery pack comprising a plurality of secondary batteries connected in series.

In order to provide a large capacity power source as the power source for a mobile device, a battery pack needs to include a unit comprising a large number of secondary batteries connected in parallel. Also, in order to provide a battery pack having a large output voltage, a large number of secondary batteries need to be connected in series.

CITATION LIST

Patent Literature

PTL 1: Japanese Laid-Open Patent Publication No. Hei 9-199177

SUMMARY OF INVENTION

Technical Problem

When secondary batteries are connected in series, the positive terminal of one battery is connected to the negative terminal of another battery, and this is simply repeated. Thus, there is no special problem even when the number of the secondary batteries is large.

On the other hand, when secondary batteries are connected in parallel, it is necessary to interconnect the positive terminals of the respective batteries with a connector (a first connector) and interconnect the negative terminals of the respective batteries with another connector (another first connector). When the number of the secondary batteries is large, a large current flows through each connector, and the amount of heat produced due to passage of current cannot be ignored.

In this case, the amount of heat produced due to passage of current is large near the connection portion for connecting each connector to an external terminal of the battery pack or the connection portion for connecting each connector to another parallel connection unit in series, since the current from the large number of secondary batteries is concentrated. As a result, the secondary batteries connected to the vicinity of the connection portion are significantly affected by the heat produced due to passage of current.

As a result, a variation in life occurs among the large number of secondary batteries connected in parallel, and the service life of the whole battery pack is shortened. To avoid this, if some of the secondary batteries which have deteriorated earlier than others are replaced, the cost of maintenance increases.

It is therefore an object of the invention to make the production of heat due to passage of current uniform in a connector for connecting a plurality of secondary batteries in parallel, thereby increasing the service life of the battery pack.

Solution to Problem

The invention provides a battery pack including: at least one unit including a plurality of batteries and a first connector for connecting the batteries in parallel; and a second connector interconnected to the first connector for connecting the unit to an external terminal or another battery or unit in series. The first connector has a current collection region to which positive terminals or negative terminals of the batteries are connected and a connection portion connected to the second connector. The current collection region is divided in two regions: (i) a distant region which is distant from the connection portion for a predetermined value or more in a direction parallel to a current collection direction; and (ii) a close region which is distant from the connection portion for less than the predetermined value in the direction parallel to the current collection direction, the close region having the same area as the distant region. The electrical resistance $R1$ of the distant region per unit length in the current collection direction is larger than the electrical resistance $R2$ of the close region per unit length in the current collection direction.

Advantageous Effects of Invention

According to the invention, the electrical resistance of the distant region of the first connector is larger than that of the close region. As a result, the difference in the amount of heat production between the distant region and the close region of the first connector can be decreased. Hence, the difference in temperature increase due to passage of current between the distant region and the close region of the first connector can be decreased. It is thus possible to prevent batteries whose terminals are connected to a specific portion of the first connector, typically, the vicinity of the portion connected to the second connector, from being heated more strongly than batteries connected to other portions.

As such, it is possible to prevent some of the batteries from deteriorating earlier than others and hence increase the service life of the whole battery pack. It is also possible to decrease the frequency of maintenance such as replacing some deteriorated batteries and enhance maintainability.

DESCRIPTION OF EMBODIMENTS

Figure 1:
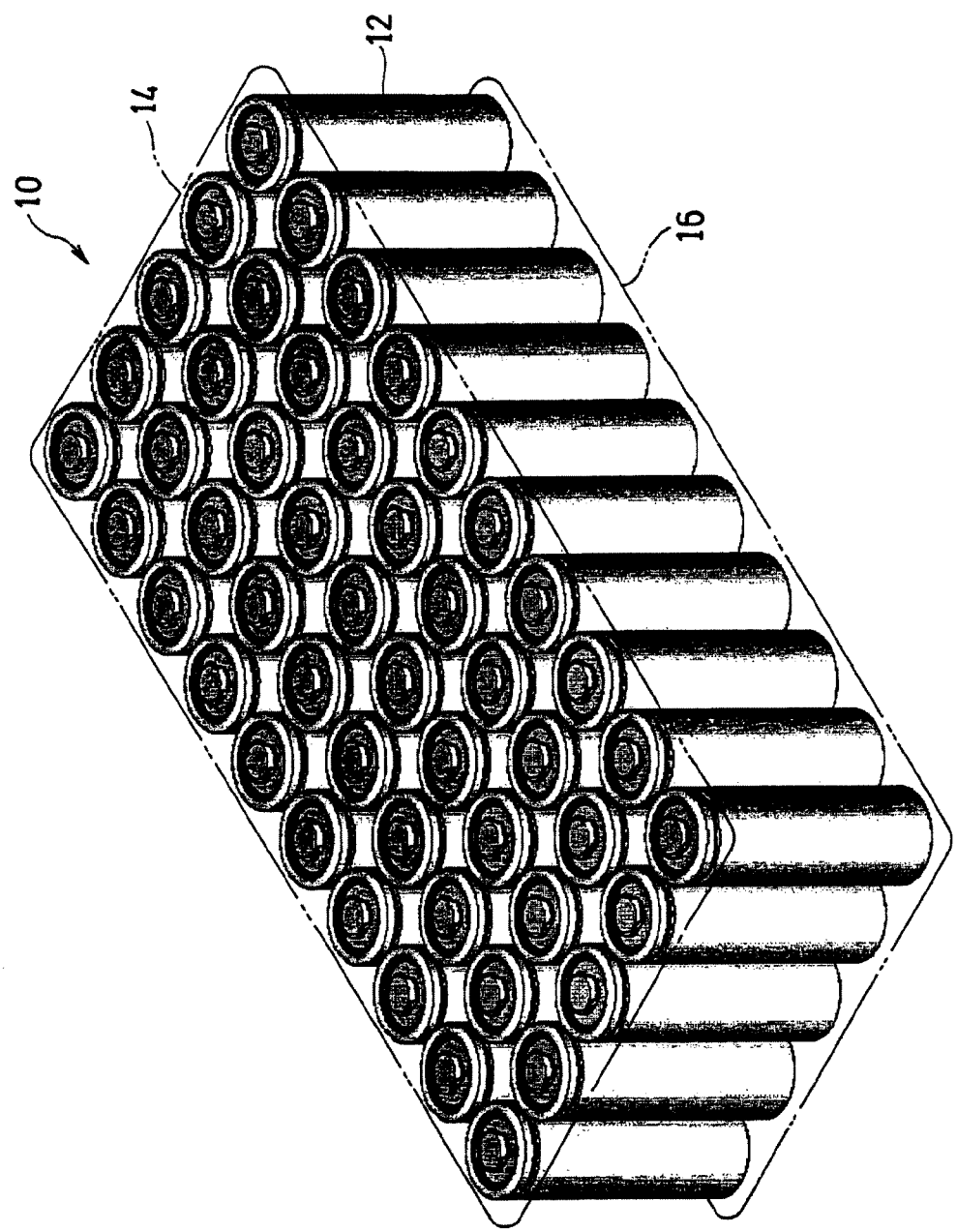
FIG. 1 is a perspective view of a unit forming a battery pack according to one embodiment of the invention.

The battery pack according to an embodiment of the invention includes: at least one unit including a plurality of batteries and a first connector for connecting the batteries in parallel; and a second connector interconnected to the first connector for connecting the unit to an external terminal or another battery or unit in series. The first connector has a current collection region to which positive terminals or negative terminals of the batteries are connected and a connection portion connected to the second connector.

The current collection region is divided in two regions: (i) a distant region which is distant from the connection portion for a predetermined value or more in a direction parallel to a current collection direction; and (ii) a close region which is distant from the connection portion for less than the predetermined value in the direction parallel to the current collection direction, the close region having the same area as the distant region. The electrical resistance R1 of the distant region per unit length in the current collection direction is larger than the electrical resistance R2 of the close region per unit length in the current collection direction.

The respective batteries of the battery pack are connected to the respective parts of the current collection region of the first connector. The current from the respective batteries is collected to the connection portion by passing through the respective parts of the current collection region. Thus, the closer to the connection portion the part of the current collection region is, the larger the current becomes. That is, the close region has a larger current than the distant region. Hence, if the electrical resistance R1 of the distant region and the electrical resistance R2 of the close region are the same, the close region produces a larger amount of heat due to current, thereby exhibiting a greater temperature increase. This results in a difference in the temperatures of the respective batteries connected to the respective parts of the current collection region and a difference in life. Therefore, the lives of some of the batteries included in the battery pack may be shortened, in which case, the life of the whole battery pack is shortened.

According to the invention, by making the electrical resistance R2 of the close region smaller than the electrical resistance R1 of the distant region, it is possible to suppress a temperature increase of the close region and suppress a reduction in the lives of some of the batteries included in the battery pack. It is therefore possible to prevent the life of the whole battery pack from becoming shortened.

The ratio R1/R2 of the electrical resistance R1 of the distant region to the electrical resistance R2 of the close region is preferably in the range of 1.2 to 10. If the ratio is less than 1.2, a temperature increase of the close region may not be sufficiently suppressed and a reduction in the lives of only some of the batteries may not be prevented. If the ratio exceeds 10, the electrical resistance R1 of the distant region needs to be made significantly larger than the electrical resistances of common connectors, which may result in large power loss.

In the battery pack according to another embodiment of the invention, the cross-sectional area S1 of the distant region perpendicular to the current collection direction is smaller than the cross-sectional area S2 of the close region perpendicular to the current collection direction.

The electrical resistance of a conductor is inversely proportional to the cross-sectional area thereof. Thus, by making the cross-sectional area S1 of the distant region smaller than the cross-sectional area S2 of the close region, the electrical resistance R2 of the close region can be made smaller than the electrical resistance R1 of the distant region.

Further, by making the cross-sectional area S2 of the close region larger than the cross-sectional area S1 of the distant region, the difference between the current density of the close region and the current density of the distant region can be decreased. As a result, a temperature increase of the close region can be suppressed more effectively.

More specifically, when the distant region has a predetermined width perpendicular to the current collection direction and a predetermined thickness (D1), if the close region has the same width as the predetermined width and a thickness (D2) greater than the predetermined thickness (D2>D1), the cross-sectional area S2 of the close region can be made larger than the cross-sectional area S1 of the distant region.

In the battery pack according to still another embodiment of the invention, the first connector has a plurality of through-holes, the distant region has a predetermined width perpendicular to the current collection direction, a predetermined thickness, and a predetermined open area ratio B. The close region has the same width as the predetermined width, the same thickness as the predetermined thickness, and an open area ratio A smaller than the predetermined open area ratio B (A<B).

By making the open area ratio A of the close region smaller than the open area ratio B of the distant region, the cross-sectional area S2 of the close region can be made larger than the cross-sectional area S1 of the distant region on average. Further, precise adjustment of the cross-sectional area ratio S1/S2, which is difficult by other methods, can be easily made possible by a simple process such as making holes in a plate.

In the battery pack according to still another embodiment of the invention, the distant region comprises a predetermined material having a predetermined cross-sectional area perpendicular to the current collection direction, and the close region comprises a material which has the same cross-sectional area as the predetermined cross-sectional area and a smaller resistivity than that of the predetermined material. By making the resistivity of the material of the close region smaller than that of the material of the distant region, the electrical resistance R2 of the close region can be made smaller than the electrical resistance R1 of the distant region.

In this case, when the distant region comprises a first material including at least one selected from the group consisting of copper, aluminum, nickel, iron, silver, and gold, the close region comprises a second material which has a smaller resistivity than the first material and includes at least one selected from the same group.

In the battery pack according to still another embodiment of the invention, the first connector is a rectangular plate with a pair of long-side ends and a pair of short-side ends, and the connection portion is disposed along one of the long-side ends. The current collection region is divided in two so that the border between the close region and the distant region is a straight line parallel to the long-side ends.

As used herein, a pair of long-side ends refers to a pair of long sides of the rectangular first connector, and a pair of short-side ends refers to a pair of short sides of the rectangular first connector.

In the battery pack according to still another embodiment of the invention, the first connector is a rectangular plate with a pair of long-side ends and a pair of short-side ends, and the connection portion is disposed along one of the short-side ends. The current collection region is divided in two so that the border between the close region and the distant region is a straight line parallel to the short-side ends.

In the battery pack according to still another embodiment of the invention, the first connector is a rectangular grid with a pair of long-side ends and a pair of short-side ends, and the connection portion is disposed along one of the long-side ends. The current collection region is divided in two so that the border between the close region and the distant region is a straight line parallel to the long-side ends.

In the battery pack according to still another embodiment of the invention, the cross-sectional area of the current collection region perpendicular to the current collection direction is inversely proportional to the distance from the connection portion. In this case, the current densities of the respective parts of the current collection region become uniform. This makes it possible to more effectively suppress a variation in the temperatures of the respective parts of the current collection region and thus a variation in the lives of the respective batteries. The cross-sectional area does not need to be in exactly inverse proportion to the distance from the connection portion and can be in approximately inverse proportion thereto.

Embodiments of the invention are hereinafter described with reference to drawings.

FIG. 1 is a perspective view of a unit forming a battery pack according to Embodiment 1 of the invention.

A unit 10 illustrated therein includes a plurality of (50 in the illustrated example) batteries 12 and two connectors (first connectors), namely, a positive terminal connector 14 and a negative terminal connector 16. The positive terminal connector 14 is connected to the positive terminals of all the batteries 12. The negative terminal connector 16 is connected to the negative terminals of all the batteries 12. The positive terminal connector 14 is spaced apart from the negative terminal connector 16. That is, all the batteries 12 are connected in parallel by the positive terminal connector 14 and the negative terminal connector 16. In FIG. 1, for the sake of visibility, only the outlines of the positive terminal connector 14 and the negative terminal connector 16 are shown by the chain double-dashed lines. Also, only a part of the outline of the negative terminal connector 16 is shown. Also, in this embodiment, the protrusion on the upper end of each battery 12 in FIG. 1 is the positive terminal, and the bottom of each battery 12 is the negative terminal.

The batteries 12 are not particularly limited, and nonaqueous electrolyte secondary batteries such as lithium ion secondary batteries and aqueous electrolyte secondary batteries such as nickel-metal hydride storage batteries can be used advantageously. However, nickel-metal hydride storage batteries have a peak voltage in battery voltage-state of charge characteristics, and their voltage does not become highest when they are fully charged. Thus, they need to be used at lower SOC than that at the peak voltage. Also, the batteries 12 can also be primary batteries such as alkaline dry batteries and Oxyride dry batteries.

Figure 2:
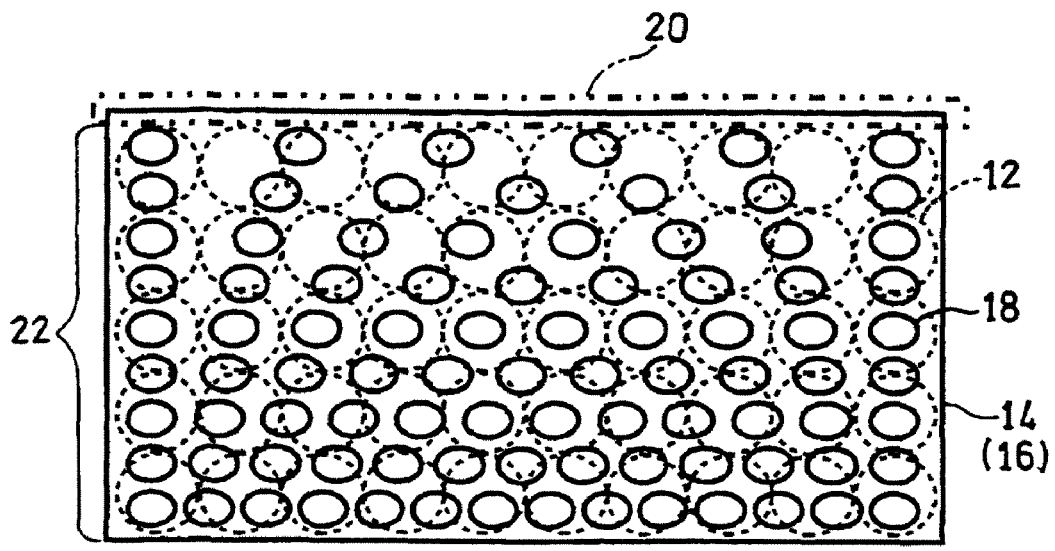
FIG. 2 is a plan view of a first connector of the unit.

FIG. 2 shows the details of a connector (first connector). Since the positive terminal connector 14 and the negative terminal connector 16 have the same structure, the positive terminal connector 14 is hereinafter described as a representative example. Thus, the following description holds true for the negative terminal connector 16 unless otherwise specified.

The positive terminal connector 14 is a plate of good conductivity including at least one of copper, aluminum, nickel, iron, silver, and gold. While the outer shape of the positive terminal connector 14 is not particularly limited, it is substantially rectangular in the illustrated example. An embodiment in which the positive terminal connector 14 is a substantially rectangular plate is described below.

The positive terminal connector 14 is connected to all the positive terminals of the batteries 12 arranged as illustrated in FIG. 1. A long-side end of the positive terminal connector 14 is a connection portion 20 to be connected to a connector (second connector) (not shown) for connecting the unit 10 to an external terminal or another unit or battery in series. The other portion of the positive terminal connector 14 than the connection portion 20 is a current collection region 22 to be connected to the positive terminals of the respective batteries 12 for collecting current from the batteries 12. In the positive terminal connector 14 of the illustrated example, the outer shape of the current collection region 22 is also rectangular. The positive terminals of the batteries 12 are connected to the current collection region 22 by, for example, welding so that they are uniformly distributed.

In the example illustrated in FIG. 2, the positive terminals of some of the batteries 12 appear to completely overlap through-holes 18. In fact, the size and position of the through-holes 18 are adjusted to prevent the positive terminals of all the batteries 12 from completely overlapping the through-holes 18. Alternatively, the positive terminals of the respective batteries 12 can be welded to a thin metal plate of the same shape and size as the positive terminal connector 14, and the metal plate can be welded to the positive terminal connector 14 of FIG. 2 so that they overlap completely.

The current collection region 22 of the positive terminal connector 14 has the through-holes 18.

With respect to the arrangement of the through-holes 18, it is preferable to form the through-holes 18 so that the open area ratio decreases toward the connection portion 20. The open area ratio can be defined, provided that the current collection region 22 is divided into a predetermined number of equal regions in the width direction (vertical direction in FIG. 2), as the value obtained by dividing the open area of the through-holes 18 of each region by the area of the whole region. The border line between the regions is perpendicular to the width direction of the current collection region 22.

That is, the total open areas of the through-holes 18 in the respective regions are decreased toward the connection portion 20. For example, assume that the current collection region 22 is divided into two equal regions in the width direction. In this case, the through-holes 18 are formed in the positive terminal connector 14 in such an arrangement that the open area ratio of the region close to the connection portion 20 is smaller than that of the region distant from the connection portion 20. The ratio A/B of the open area ratio A of the region close to the connection portion 20 to the open area ratio B of the region distant from the connection portion 20 is preferably in the range of 0.1 to 0.8. In this case, it is possible to decrease the difference in current density between the two regions and decrease the difference in the amount of heat produced due to passage of current between the two regions.

In the example illustrated in FIG. 2, the current collection region 22 is divided into nine equal regions in the width direction of the positive terminal connector 14, and the open area ratios in the nine regions decrease toward the connection portion 20. Thus, of the nine regions, the average value of the cross-sectional area perpendicular to the current collection direction increases toward the connection portion 20. Hence, of the nine regions, the average value of the electrical resistance decreases toward the connection portion 20, and the current density also decreases toward the connection portion 20. As used herein, the current collection direction refers to the average direction in which current flows through the positive terminal connector 14. In FIG. 2, the current collection direction is the vertical direction.

Also, of the two equal regions of the current collection region 22 divided in the width direction, the region close to the connection portion 20 has a smaller open area ratio. Hence, of the two regions, the region close to the connection portion 20 has a smaller average value of electrical resistance, and the difference in current density therebetween is decreased.

As described above, in the positive terminal connector 14 of the illustrated example, the through-holes 18 are formed in the current collection region 22 so that the open area ratio decreases toward the connection portion 20. Thus, the electrical resistance is relatively small in the part of the current collection region 22 close to the connection portion 20, but the electrical resistance is relatively large in the part distant from the connection portion 20. The difference in current density therebetween is small.

As a result, the difference in the amount of heat produced in the respective parts of the current collection region 22 can be decreased. It is thus possible to prevent only some of the batteries 12 from being heated strongly and having a shortened life. It is thus possible to prevent the service life of the whole unit 10 from becoming shortened and prevent the frequency of maintenance for replacing some of the batteries 12 from increasing. As such, the service life of the battery pack can be increased, and the cost necessary for maintenance can be reduced.

It is ideal to form the through-holes 18 so that the current densities of the respective parts of the current collection region 22 to which the terminals of the batteries 12 are connected are equal. That is, it is preferable to form the through-holes 18 so that the distance (distance parallel to the current collection direction) between the respective parts of the current collection region 22 and the connection portion 20 is inversely proportional to the cross-sectional area (cross-sectional area perpendicular to the current collection direction). By setting the open area ratios of the respective parts of the current collection region 22 in the above-described manner, the amount of heat produced due to passage of current can be made more uniform throughout the current collection region 22. As a result, it is possible to completely prevent only some of the batteries 12 from having a shortened life and increase the service life of the battery pack more reliably.

The size, shape and area of the through-holes 18 are not particularly limited. Also, the through-holes 18 may have the same size, shape and area, or the through-holes 18 may have different size, shape and area. For example, it is also possible to make the density of the through-holes 18 in the current collection region 22 constant and increase the size of the through-holes 18 as the distance from the connection portion 20 of the positive terminal connector 14 increases.

However, in consideration of the ease with which the large number of through-holes 18 are formed, it is preferable that all the through-holes 18 have the same size, shape and area. In this case, an increase in production cost can be suppressed.

The shape of the through-holes 18 is not particularly limited, and any shapes such as a triangle, a square, a rectangle, a rhombus, other parallelograms, a trapezoid, and polygons with five or more sides may be used. However, in order to minimize a decrease in the strength of the positive terminal connector 14 when the large number of through-holes 18 are formed in the positive terminal connector 14, the through-holes 18 are preferably circular or oval. They are most preferably circular, in which case a decrease in the strength of the positive terminal connector 14 can be suppressed.

The size (maximum size) of the through-holes 18 is preferably 0.01 to 5 mm. If the size of the through-holes 18 is more than 5 mm, the strength of the positive terminal connector 14 lowers significantly. If the size of the through-holes 18 is less than 0.01 mm, a very large number of through-holes 18 become necessary to obtain the desired effect, and the amount of workload in the process for forming the through-holes 18 increases. As a result, the production cost increases. Thus, by setting the size of the through-holes 18 to 0.01 to 5 mm, an increase in the production cost of the positive terminal connector 14 can be suppressed and a decrease in the strength can be suppressed.

Also, in order to suppress a decrease in the strength caused by the formation of the through-holes 18, it is preferable to make the positive terminal connector 14 thick, compared with the positive terminal connector 14 having no through-holes 18. When the minimum thickness of a current collector having no through-holes 18 is designated as D1, the thickness D0 of the positive terminal connector 14 is desirably 120 to 600% of D1.

The above description of the positive terminal connector 14 holds true for the negative terminal connector 16, except that the negative terminals of the batteries 12 are connected to the negative terminal connector 16.

Embodiment 2

Embodiment 2 of the invention is hereinafter described.

Figure 3:
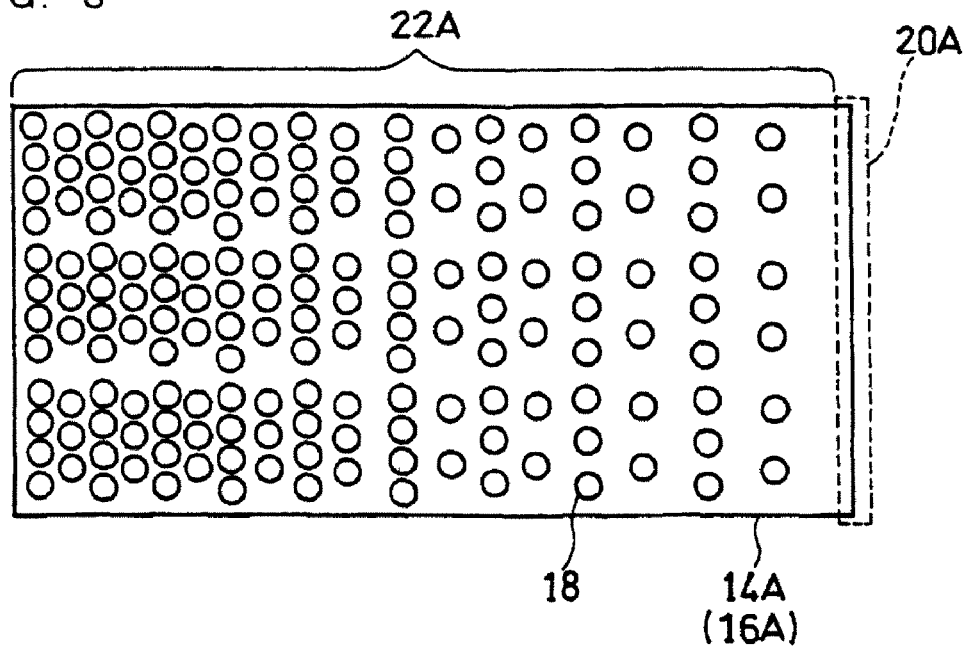
FIG. 3 is a plan view of a first connector used in a battery pack according to another embodiment of the invention.

FIG. 3 is a plan view of a connector (first connector) used in a battery pack of Embodiment 2. In FIG. 3, the same components as those of FIG. 1 are represented by the same characters.

A positive terminal connector 14A (negative terminal connector 16A) illustrated therein also has a connection portion 20A, a current collection region 22A, and a plurality of through-holes 18 formed in the current collection region 22A in the same manner as the positive terminal connector 14 (negative terminal connector 16) of FIG. 1. The positive terminal connector 14A is different from the positive terminal connector 14 of FIG. 2 in that the connection portion 20A is disposed at one end (a short-side end) in the longitudinal direction.

In the positive terminal connector 14A, the open area ratio of the current collection region 22A also decreases toward the connection portion 20A. That is, assuming that the current collection region 22A is divided into a predetermined number (for example, two) of equal regions in the longitudinal direction, the closer to the connection portion 20A the region is, the smaller the open area ratio is. The border line between the regions is parallel to the short-side ends of the positive terminal connector 14A.

With the above configuration, even when the connection portion 20 is formed at one end of the positive terminal connector 14A in the longitudinal direction, essentially the same effect as that of Embodiment 1 can be achieved.

In Embodiments 1 and 2, the open area ratio is changed to change the cross-sectional areas (cross-sectional area perpendicular to the current collection direction) of the respective divided regions of the current collection region. However, it is also possible to change the thickness of the current collection region having a predetermined width to change the cross-sectional areas of the respective divided regions of the current collection region. That is, by increasing the thicknesses of the divided regions toward the connection portion, the difference in current density among the respective divided regions of the current collection region can be decreased. This can produce essentially the same effect as those of Embodiments 1 and 2. Also, the thickness of the current collection region can be set so that it is inversely proportional to the distance from the connection portion.

Embodiment 3

Embodiment 3 of the invention is hereinafter described.

Figure 4:
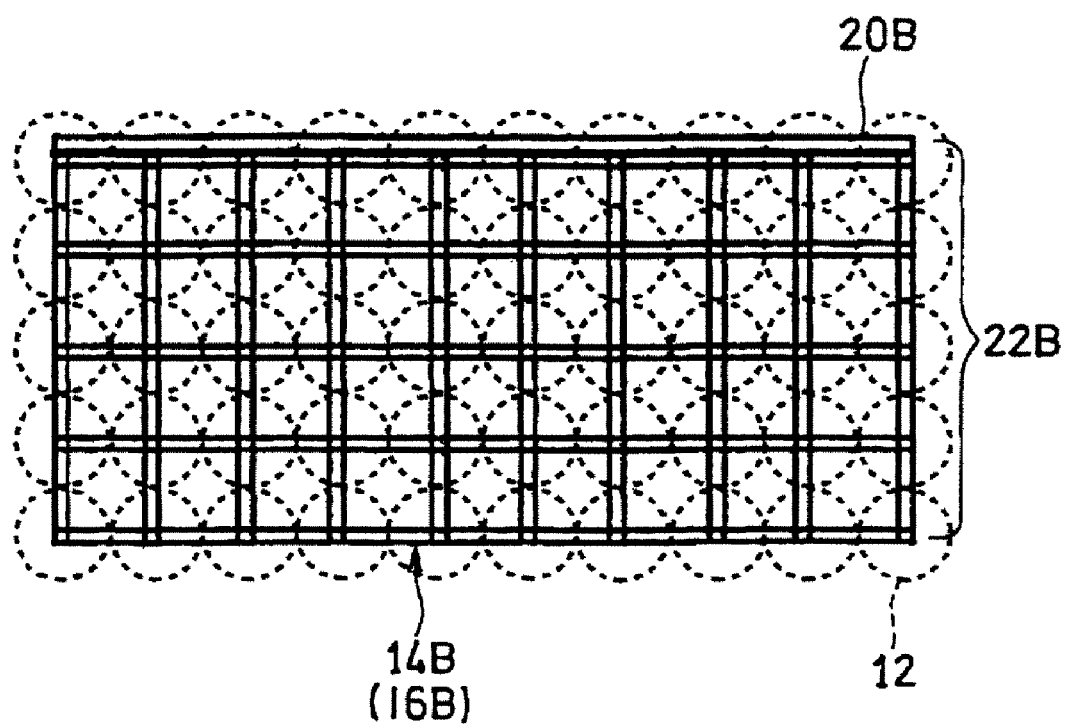
FIG. 4 is a plan view of a first connector used in a battery pack according to still another embodiment of the invention.

FIG. 4 is a plan view of a connector (first connector) used in a battery pack of Embodiment 3. In FIG. 4, the same components as those of FIG. 1 are represented by the same characters.

A positive terminal connector 14B (negative terminal connector 16B) illustrated therein is made of a plurality of conductive bars that are assembled into a grid pattern. The positive terminal connector 14B (negative terminal connector 16B) also has a connection portion 20B and a current collection region 22B in the same manner as the positive terminal connector 14 (negative terminal connector 16) of FIG. 1. The outer shape of the positive terminal connector 14B is rectangular. The connection portion 20B is disposed at one end (a long-side end) of the rectangle in the width direction thereof.

In the positive terminal connector 14B, the electrical resistances of the respective parts of the current collection region 22B decrease toward the connection portion 20B. That is, assuming that the current collection region 22B is divided into a predetermined number (for example, two) of equal regions in the width direction of the positive terminal connector 14B, the closer to the connection portion 20B the region is, the smaller the electrical resistance is. The border line between the regions is parallel to the long-side ends of the positive terminal connector 14B.

The electrical resistances of the respective regions can be changed by several methods. For example, in the case of using a plurality of conductive bars with a predetermined cross-sectional area, different materials can be used. That is, a material with a relatively low resistivity is used for the conductive bars used for a region close to the connection portion 20B, while a material with a relatively large resistivity is used for the conductive bars used for a region distant from the connection portion 20B. In this case, even when the positive terminal connector 14B is made of a plurality of conductive bars with a predetermined cross-sectional area, the electrical resistances of the respective regions can be decreased toward the connection portion 20B. Hence, essentially the same effect as those of Embodiments 1 and 2 can be obtained.

Also, when the same material is used for the conductive bars, the cross-sectional area of the conductive bars can be changed. That is, the cross-sectional area of the conductive bars used for a region close to the connection portion 20B is made relatively large, while the cross-sectional area of the conductive bars used for a region distant from the connection portion 20B is made relatively small. In this case, even when the positive terminal connector 14B is made of a plurality of conductive bars which are made of the same material, the electrical resistances of the respective regions can be decreased toward the connection portion 20B, and the difference in current density among the respective regions can be decreased. Thus, essentially the same effect as those of Embodiments 1 and 2 can be obtained.

An example according to Embodiments 1 to 3 is hereinafter described. The invention is not to be construed as being limited to the following Example.

Example 1

Fifty lithium ion secondary batteries (rated maximum voltage: 4.2 V) with a capacity of 2.0 Ah were prepared.

Copper rectangular plates with a thickness of 0.3 mm, a width of 100 mm, and a length of 200 mm were prepared as positive and negative terminal connectors. One long-side end of each copper plate was provided with a connection portion, and a plurality of through-holes were formed in the copper plate so that the open area ratio decreased toward the connection portion, as illustrated in FIG. 2. The through-holes were circular and had a diameter of 2 mm.

With respect to the distribution of the open area ratio, assuming that the copper plate was divided into six equal regions in the width direction, the open area ratio of the region adjacent to the connection portion was set to 10%, and the open area ratio of the region farthest from the connection portion was set to 60%. The open area ratios of the four regions between these two regions, from the region closest to the connection portion to the region farthest therefrom, were set to 20%, 30%, 40%, and 50%, respectively. Also, assuming that the current collection region was divided into two equal regions in the width direction of the copper plate, the ratio of the open area ratio was 0.375.

Using two copper plates in which through-holes were formed at such open area ratio distribution, the fifty secondary batteries arranged in 5×10 were connected in parallel. That is, all the positive terminals of the fifty secondary batteries were welded to one of the copper plates. Also, all the negative terminals of the fifty secondary batteries were welded to the other copper plate. A unit was produced in this manner.

Comparative Example 1

Two 0.2-mm thick copper plates of the same material, width, and length as the copper plates of Example 1 were prepared. No through-holes were formed in these copper plates. The two copper plates had the same weight as those of Example 1. Using these copper plates, fifty secondary batteries were connected in parallel to form a unit in the same manner as in Example 1.

The units of Example 1 and Comparative Example 1 were subjected to 500 charge/discharge cycles. In an environment of 20° C., they were charged to 4.2 V at a constant current of 0.7 C, charged to a cut-off voltage of 0.05 C at a constant voltage, and discharged to 2.5 V at a constant current of 0.2 C. The discharge capacity obtained was defined as the initial discharge capacity. Thereafter, with the discharge current value set to 1 C, the charge/discharge cycle was repeated.

Of each of Example 1 and Comparative Example 1, the average value of the capacity retention rates of the fifty batteries and the average value of the capacity retention rates of the ten batteries connected to the part closest to the connection portion were obtained. The capacity retention rate as used herein refers to the percentage of the discharge capacity at the $500^{th}$ cycle relative to the discharge capacity at the first cycle. The results are shown in Table 1.

TABLE 1

|  | Capacity retention rate (%) of all the batteries | Capacity retention rate (%) of 10 batteries |
| --- | --- | --- |
| Example 1 | 84 | 81 |
| Comparative Example 1 | 78 | 70 |

As shown in Table 1, in Example 1, the difference between the capacity retention rate of the ten batteries closest to the connection portion and the capacity retention rate of all the batteries is 3%, whereas in Comparative Example 1, the difference is 8%, which is very large. This has confirmed that the invention can prevent the lives of only some of the batteries from becoming shortened.

INDUSTRIAL APPLICABILITY

In the battery pack according to the invention, the difference in the amount of heat produced due to passage of current between the part of the connector close to the connection portion and the part distant therefrom is small. Thus, deterioration of the secondary batteries due to heat can be suppressed particularly near the connection portion. Therefore, the invention is advantageously applicable to battery packs of secondary batteries which are required to have good cycle characteristics as various power sources.

[Reference Signs List]

| | |
|---|---|
| 10 | Unit |
| 12 | Secondary Battery |
| 14 | Positive terminal connector |
| 16 | Negative terminal connector |
| 18 | Through-Hole |
| 20 | Connection portion |
| 22 | Current Collection Region |

The invention claimed is:

1. A battery pack comprising:
   at least one unit comprising a plurality of batteries and a first connector for connecting the batteries in parallel; and
   a second connector interconnected to the first connector for connecting the unit to an external terminal or another battery or unit in series,
   wherein the first connector has a current collection region to which positive terminals or negative terminals of the batteries are connected and a connection portion connected to the second connector,
   the current collection region is divided in two regions:
   (i) a distant region which is distant from the connection portion for a predetermined value or more in a direction parallel to a current collection direction; and
   (ii) a close region which is distant from the connection portion for less than the predetermined value in the direction parallel to the current collection direction, the close region having the same area as the distant region, and
   the electrical resistance R1 of the distant region per unit length in the current collection direction is larger than the electrical resistance R2 of the close region per unit length in the current collection direction.

2. The battery pack in accordance with claim 1, wherein the ratio R1/R2 of the electrical resistance R1 to the electrical resistance R2 is in the range of 1.2 to 10.

3. The battery pack in accordance with claim 1, wherein the cross-sectional area S1 of the distant region perpendicular to the current collection direction is smaller than the cross-sectional area S2 of the close region perpendicular to the current collection direction.

4. The battery pack in accordance with claim 3,
   wherein the distant region has a predetermined width perpendicular to the current collection direction and a predetermined thickness, and
   the close region has the same width as the predetermined width and a thickness greater than the predetermined thickness.

5. The battery pack in accordance with claim 3,
   wherein the first connector has a plurality of through-holes,
   the distant region has a predetermined width perpendicular to the current collection direction, a predetermined thickness, and a predetermined open area ratio B, and
   the close region has the same width as the predetermined width, the same thickness as the predetermined thickness, and an open area ratio A smaller than the predetermined open area ratio B.

6. The battery pack in accordance with claim 1,
   wherein the distant region comprises a predetermined material having a predetermined cross-sectional area perpendicular to the current collection direction, and
   the close region comprises a material which has the same cross-sectional area as the predetermined cross-sectional area and a smaller resistivity than that of the predetermined material.

7. The battery pack in accordance with claim 6,
   wherein the distant region comprises a first material including at least one selected from the group consisting of copper, aluminum, nickel, iron, silver, and gold, and
   the close region comprises a second material which has a smaller resistivity than the first material and includes at least one selected from said group.

8. The battery pack in accordance with claim 1,
   wherein the first connector is a rectangular plate with a pair of long-side ends and a pair of short-side ends,
   the connection portion is disposed along one of the long-side ends, and
   the current collection region is divided in two so that a border between the close region and the distant region is a straight line parallel to the long-side ends.

9. The battery pack in accordance with claim 1,
   wherein the first connector is a rectangular plate with a pair of long-side ends and a pair of short-side ends,
   the connection portion is disposed along one of the short-side ends, and
   the current collection region is divided in two so that a border between the close region and the distant region is a straight line parallel to the short-side ends.

10. The battery pack in accordance with claim 1,
    wherein the first connector is a rectangular grid with a pair of long-side ends and a pair of short-side ends,
    the connection portion is disposed along one of the long-side ends, and
    the current collection region is divided in two so that a border between the close region and the distant region is a straight line parallel to the long-side ends.

11. The battery pack in accordance with claim 1, wherein the cross-sectional area of the current collection region perpendicular to the current collection direction is inversely proportional to a distance from the connection portion.

* * * * *